July 29, 1958     O. KRACHT ET AL     2,845,082
AUTOMATIC AIR VOLUME CONTROL FOR LIQUID SUPPLY SYSTEMS
Filed Dec. 15, 1953
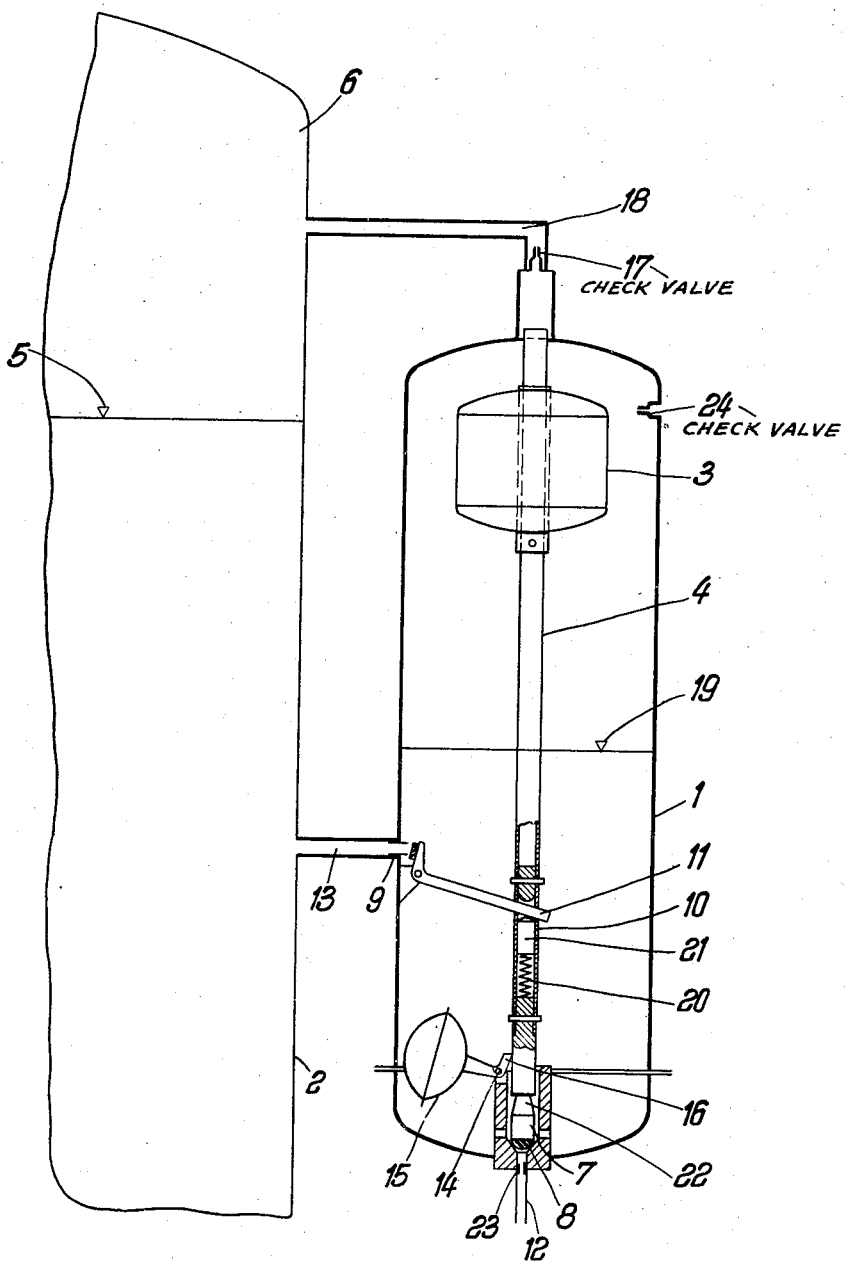
Inventors:
Otto Kracht
Hans Schumacher
AGENT:

United States Patent Office 2,845,082
Patented July 29, 1958

2,845,082

AUTOMATIC AIR VOLUME CONTROL FOR LIQUID SUPPLY SYSTEMS

Otto Kracht and Hans Schumacher, Werdohl, Westphalia, Germany, assignors to Kracht Pumpen- und Motorenfabrik G. m. b. H., Werdohl, Westphalia, Germany Application December 15, 1953, Serial No. 398,376

Claims priority, application Germany December 15, 1952

1 Claim. (Cl. 137—209)

This invention relates to an automatic air volume control for a liquid pumping system, and particularly refers to a device for maintaining the required air pressure in the pressure tank of water supply or hydraulic systems.

Automatic water supply installations, for instance for buildings and homes not connected to an established water supply system, generally comprise a well, a pump, and a pneumatic storage or pressure tank into which the pump delivers the water pumped from the well. The pressure of the air cushion enclosed in the upper part of the tank above the water line is maintained at a predetermined value, which is somewhat higher than that corresponding to the elevation to which water must be forced in the connected building or plant; as soon as said pressure is obtained in the tank, the pump is automatically inactivated. As water is withdrawn from the tank, the air cushion over the water level expands; as soon as the pressure of the air drops below a predetermined value, the pump is automatically started, and the water in the tank is replenished to a predetermined quantity corresponding to the upper predetermined pressure of the air cushion.

Recently, analogous installations are being employed in hydraulic systems where oil is being stored under pressure in a manner used for a long time in water supply systems. An essential advantage of such installations is that larger amounts of pressure oil can be supplied with small pumps; during the time when no oil is withdrawn from the pressure tank, the pump delivers oil into the tank; in this way, much more oil can be withdrawn for short periods of time than the pump will deliver within the same period. As in a water supply system, the operation of the pump is controlled by a regulator which shuts down the pump at a predetermined maximum pressure and starts it again at a predetermined minimum pressure.

As such pressure tanks are generally operated at relatively high pressures, the air cushioning is of particular importance; only relatively large air cushions are capable of sufficient expansion so as to allow of withdrawing large oil amounts from the tank in the period between two pumping cycles.

Experience has shown that the air volume above the liquid level in the tank gradually diminishes. For small water supply systems, for instance for use in two-family homes, a specific control and adjustment of the amount of air in the pneumatic tank will seldom be required. But in large supply systems, for instance for isolated factories requiring large amounts of water under elevated pressure, and still more in hydraulic installations, the air cushion in a pressure tank must be continuously watched and controlled to maintain its proper volume and pressure and to insure proper operation of the installation. It appears that heretofore the preferred control procedures comprised air check valves (snifter valves) permitting air to flow into the pump but not out from the pump (used particularly for domestic water supply systems), or compressors for replenishing the air cushion (for industrial water supply systems). The former method has the serious drawback that particularly in reciprocating piston type pumps the output is affected by the air introduced at the suction side; furthermore, a complete control is difficult to obtain in this manner. The latter method requires an additional compressor or a supply of compressed air.

An object of the invention is to provide in water or oil supply systems of the character described an automatic regulator of the air volume in pneumatic storage tanks.

Another object of the invention is to provide means to produce, independently of the pump, an air cushion of predetermined volume, and to maintain said volume, so that the installation needs no attendance and so that not even a precompression is required for initiating the operation.

According to the invention, the pneumatic tank, of which the air volume is to be maintained constant within predetermined limits, is connected in parallel with a regulator which is designed also as a pneumatic tank, in such a way that the liquid in the lower part of the pneumatic tank communicates with the liquid in the lower part of the regulator while the air volume in the upper part of the regulator communicates with the air volume of the pneumatic tank through a check valve. Under certain conditions, liquid can flow from the pneumatic tank into the regulator, and air can flow from the regulator into the pneumatic tank, whereas the reverse path is always blocked for the air and is blocked in certain cases for the liquid medium.

When there is a too small air cushion and consequently a too high liquid level in the pneumatic tank, the pressure differential with respect to the regulator allows liquid to pass from the pneumatic tank into the regulator and to displace air from the regulator into the tank.

In order to replace said displaced air volume, we provide in the upper wall of the regulator, or at any other suitable place of the air space, an inwardly opening check valve, which allows the admission of air from the outside into the regulator in certain stages of the operation when the pressure in the regulator has sufficiently decreased.

The proper operation of the supply system requires further a discharge device, which is preferably provided at the lowermost part of the regulator. Said discharge device is kept closed by the lower end of a float stem or valve needle until the float, which is slidably mounted or adjustably secured to said stem, if lifted by the rising liquid in the regulator so as to raise the lower end of the stem from its seat and to open the discharge port. The float stem is maintained in the open position, preferably by means of a mechanical, hydraulic or magnetic locking mechanism. In opposite direction to the discharge device, the float stem controls a feeding means for the regulator which allows of filling the regulator from the pressure tank when the discharge device is closed.

The above-mentioned general objects of our invention, together with others referring particularly to oil supply systems, are attained by the device illustrated in the drawing, showing a diagrammatic view in vertical section of a side wall and the upper cap of a pneumatic tank of a water supply system, with a regulator laterally secured thereto, as a preferred embodiment of our invention.

Referring to the drawing, a regulator housing 1 is laterally secured to the upright pressure tank 2 by means of nipples and pipe connections conveniently used for water-level gauges. The lower conduit connects the regulator with the water space, the upper connection with the air space of the tank. The housing 1 is preferably cylindrical, and a float spindle 4 is axially arranged in the center of the cylinder. The float spindle 4 carries a float 3; the lower end of the float spindle forms a valve body 7, which in the lowest position of the float spindle closes the drainage valve 8. The float 3 is axially adjustable on the float spindle 4 and is preferably secured in a position which corresponds substantially to that water level 5 in the pressure tank which is defined by a properly dimensioned air cushion 6; said level will be designated hereinafter as the "desired level."

The overflow or admission valve 9, which may close the pipe 13 connecting the pressure tank with the regulator inside of the regulator casing, is mounted on the short arm of a two-armed lever 11, which is pivotally mounted on the wall of said casing. The long arm of the lever 11 passes through a slot 10 of the float rod 4 and rests on a plunger 21, which is pressed upwardly by a spring 20. The rod 4 of the float is recessed at some distance from its lower end, so as to provide an annular notch 22, which can be engaged by a pawl 16 when the rod 4 is in raised position. The pawl 16 is the short arm of a second bell-crank lever which is pivotally mounted inside the regulator and the long arm of which supports an auxiliary float 15.

A discharge pipe 12, which has a contraction 23 below the discharge valve 8, discharges preferably into the well from which the pump draws its water.

The top of the regulator is connected by a second connecting pipe 18 with the air space of the pressure tank; a check valve 17 allows the air to pass from the regulator to the pressure tank but blocks it off in the opposite direction. The check valve 17 is preferably a rubber valve (similar to the air valves in bicycle tubes), which requires a certain slight pressure to open in the allowed direction but does not permit any passage of air in the blocked direction. The numeral 19 designates the varying liquid level of the regulator; the snifter valve 24 opens only inwardly and allows the passage of atmospheric air into the interior of the regulator when no overpressure over the atmosphere exists therein.

In order to understand the function of the device, we shall distinguish the following different phases of operation.

*1. Starting up the pressure tank without precompression*

The air cushion of the pressure tank started up without precompression is so small that the liquid level 5 is, at the pump starting pressure as well as at the pump stopping pressure, above the desired level.

The pressure tank 2 is filled by the pump with water. The float stem 4 in the regulator 1 keeps the discharge valve 8 closed and the admission valve 9 open. As soon as the rising water level 5 reaches the connecting pipe 13, the water passes also into the regulator 1. First the auxiliary float 15 is floated; it rises and presses the pawl 16 laterally against the float stem 4.

Because of the open admission valve 9, the pressure tank and the regulator are communicating vessels; therefore, the water level 19 in the regulator 1 and the water level 5 in the pressure tank 2 keep rising. Simultaneously, the air above the water level 19 is displaced through the check valve 17 into the air cushion of the pressure tank. As a result, the water level 19 lags behind the water level 5 by the height of a water column exerting the pressure required to open the check valve 17.

Before the pump stopping pressure is reached, both water levels rise so far that the float 3 raises the stem 4. Thereby the discharge valve 8 is opened, the admission valve 9 is closed, and the pawl 16 engages the notch 22 and maintains the rod of the float in its raised position. The contraction 23 below the valve 8 serves to facilitate the lifting of the float stem; because the outflowing water is dammed up below the valve end 7 of the float stem and relieves the same. As long as the float stem 4 is locked in its upper position by the pawl 16, water flows out of the regulator through the valve 8; the rate of said flow is at first fast, due to the expansion of the air volume compressed in the air space of the regulator, and then slows down after expansion of said air volume to atmospheric pressure; during this period, air is inhaled into the regulator through the check valve (snifter) 24. After the discharge has proceeded to a point where the lift of the auxiliary float 15 is no longer sufficient to keep the locking mechanism 16, 22 in positive engagement, the float stem falls back into its starting position, closes the discharge valve 8 and opens the admission valve 9. (During this entire period of time, the pump has gone on operating.)

In response to the overpressure in the pressure tank, water flows into the regulator for a new regulating cycle; the water level 19 rises and compresses the air just inhaled through the valve 24 first to the present operating pressure of the pressure tank. As the water level 5, because of the yet too small air cushion, still oscillates above the desired level, the water level 19 in the regulator keeps rising so as to deliver again air into the air cushion until the float 3 and its stem are again lifted to start a new discharge.

By a continual repetition of the regulating cycle, the air cushion is extended with each cycle until the water level 5 does no longer oscillate above the desired level but is during a pumping cycle temporarily even below said desired level.

*2. Pumping cycle superposes regulating cycle*

When at the beginning of a regulating cycle the water level 19 has risen to a height sufficient to compress the previously inhaled air to the operating pressure of the pressure tank, while the pump has not yet started and the water level 5 is still below the desired level, said water level 19 is not yet sufficient to lift the float. Only after the pump has re-started and the level 5 in the pressure tank has resumed its rise, also the level 19 will rise until the float is lifted and the regulator is switched to discharge. Said switch can be produced only when the water level 5 is above the desired level. In this operative stage, the air cushion is further replenished until the water level 5 does no longer exceed, even at the pump stopping pressure, the desired level, i. e. until the air cushion has attained its desired volume or its normal state, as determined by the adjusted level of the float mechanism.

*Normal operation*

For the reasons given above, the regulator does no longer switch to discharge. When water is withdrawn and the water level 5 drops, the level 19 in the regulator drops too, because water flows back from the regulator through the admission valve 9 into the pressure tank, so that there is at all times pressure equilibrium in the regulator and pressure tank. In this state, the regulator is a second pressure tank connected in parallel.

As soon as the air cushion becomes smaller, so that the water level 5 exceeds the desired level by a small amount before the pump stopping pressure has been reached, the regulator cycle starts immediately and replenishes the air cushion to the desired volume.

In order to avoid interruptions in the water supply during repairs and cleaning operations, we prefer to provide in each of the pipes 13 and 18 a stop valve (not shown), which allow to disconnect temporarily the regulator 1 from the pressure tank 2. During the time of the cleaning work, the system is then operated without air cushion regulation.

The essential characteristics of the apparatus may be summed up as follows:

(1) The regulator is an element of the pressure tank 2 and operates therefore independently of the pump.

(2) The regulator operates in such a way that when the stopping pressure is reached, the water assumes in the pressure tank a desired predetermined level 5; in this way, it is possible to adjust the air cushion for any system to an optimum volume under consideration of the starting and stopping pump pressure.

(3) The regulator releases the pump from the function of also supplying air. Therefore, the pump can be designed for water delivery only. This is of particular advantage for reciprocating piston pumps.

(4) A precompression of the air in the pressure tank is no longer required. The regulator automatically builds up the air cushion to the desired volume and then maintains said volume constant.

The invention in its broader aspects is not limited to the specific details and combinations shown but modifications may be made within the scope of the accompanying claim without departing from the principles of the invention.

What we claim is:

An automatic air volume control for liquid supply systems comprising a pressure tank, a regulator tank laterally attached to said pressure tank by a liquid flow connection between said pressure tank and said regulator tank and an air flow connection between said pressure tank and said regulator tank, a discharge port in the floor of said regulator tank, a float stem having a lower end controlling said discharge port, a float secured to said float stem, valve means controlling said liquid flow connection, means actuating said valve means, said valve actuating means being controlled by said float stem inversely to the control of said discharge port, so that the liquid flow connection is open when the discharge port is closed and vice versa a two-armed lever pivotally mounted on the inner wall of said regulator tank, an auxiliary float secured to one arm of said lever, the other arm of said level engaging said float stem and holding said float stem after said auxiliary float has been lifted sufficienty to open the discharge port, a check valve in said air flow connection allowing flow of air only from said regulator tank into said pressure tank, and an inwardly opening check valve in the wall near the top of said regulator for admitting air from the atmosphere into said regulator when the air pressure in said regulator drops below atmospheric pressure.

References Cited in the file of this patent

UNITED STATES PATENTS

| | | |
|---|---|---|
| 1,938,956 | Fee | Dec. 12, 1933 |
| 2,172,097 | Burks | Sept. 5, 1939 |
| 2,698,710 | Pedroia | Jan. 4, 1955 |